(12) United States Patent
Han et al.

(10) Patent No.: US 8,853,633 B2
(45) Date of Patent: Oct. 7, 2014

(54) THZ-WAVE GENERATION /DETECTION MODULES AND DEVICES INCLUDING THE SAME

(75) Inventors: Sang-Pil Han, Daejeon (KR); Kyung Hyun Park, Daejeon (KR); Hyunsung Ko, Seoul (KR); Namje Kim, Daejeon (KR); Chul-Wook Lee, Daejeon (KR); Dong-Hun Lee, Daejeon (KR); Young Ahn Leem, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 13/309,583

(22) Filed: Dec. 2, 2011

(65) Prior Publication Data
US 2012/0153161 A1 Jun. 21, 2012

(30) Foreign Application Priority Data
Dec. 16, 2010 (KR) .......................... 10-2010-0129150

(51) Int. Cl.
*G01J 5/02* (2006.01)
*G01J 3/42* (2006.01)
(52) U.S. Cl.
CPC ........................................ *G01J 3/42* (2013.01)
USPC ......................................... 250/353; 250/341.1
(58) Field of Classification Search
USPC ................................................ 250/353, 341.1
See application file for complete search history.

(56) References Cited

U.S. PATENT DOCUMENTS

| 5,663,639 | A | * | 9/1997 | Brown et al. | .................... 324/96 |
| 8,053,732 | B2 | * | 11/2011 | Choi et al. | ................. 250/341.1 |
| 8,294,106 | B2 | * | 10/2012 | Nakajima | .................... 250/353 |
| 2006/0018098 | A1 | * | 1/2006 | Hill et al. | ....................... 361/708 |
| 2008/0212974 | A1 | * | 9/2008 | Davies et al. | ................. 398/140 |
| 2009/0101823 | A1 | * | 4/2009 | Jez et al. | ..................... 250/341.1 |
| 2009/0207090 | A1 | * | 8/2009 | Pettus et al. | .................. 343/873 |

* cited by examiner

*Primary Examiner* — Christine Sung
(74) *Attorney, Agent, or Firm* — Rabin & Berdo, P.C.

(57) ABSTRACT

Provided are a THz-wave generation/detection module and a device including the same, which increase heating efficiency and are miniaturized. The module includes a photomixer chip, a lens, a PCB, and a package. The photomixer chip includes an active layer, an antenna, and a plurality of electrode pads. The lens is disposed on the photomixer chip. The PCB includes a plurality of solder balls connected to the electrode pads, under the photomixer chip. The package surrounds a bottom and side of the PCB, and dissipates heating of the active layer, which is transferred from the electrode pad of the photomixer chip to the PCB, to outside.

14 Claims, 11 Drawing Sheets

THZ-WAVE GENERATION/DETECTION MODULES AND DEVICES INCLUDING THE SAME

CROSS-REFERENCE TO RELATED APPLICATIONS

This U.S. non-provisional patent application claims priority under 35 U.S.C. §119 of Korean Patent Application No. 10-2010-0129150, filed on Dec. 16, 2010, the entire contents of which are hereby incorporated by reference.

BACKGROUND OF THE INVENTION

The present invention disclosed herein relates to an electromagnetic wave generation/detection module and a device including the same, and more particularly, to a THz-wave generation/detection module and a device including the same.

Terahertz (THz) wave is electromagnetic wave having a frequency of 0.1 THz to 10 THz between infrared light and microwave. Among this, THz wave having a frequency domain of 0.1 THz to 5 THz is widely being applied to spectroscope, detection of harmful substance, and security. Also, THz wave are being used even for basic science such as physics, chemistry, biology, and medicine.

For example, THz wave may be generated by photoconductive switching. In photoconductive switching, when a plurality of laser beams are inputted to an active layer of a photomixer chip, a resistance of the active layer is modulated by light, and thus THz wave corresponding to a bit frequency may be generated. The active layer of the photomixer chip may be heated at a high temperature due to self heating when THz wave is generated. High-temperature heat degrades characteristic of the photomixer chip, and moreover, shortens the service life of the photomixer chip. However, a typical THz-wave transmission/reception apparatus does not have a heat dissipation structure for removing the heating of the photomixer chip.

SUMMARY OF THE INVENTION

The present invention provides a THz-wave generation/detection module and a device including the same, which increase or maximize heat dissipation efficiency.

The present invention also provides a THz-wave generation/detection module with a subminiature size and a device including the same.

The present invention also provides a THz-wave generation/detection module and a device including the same, which efficiently apply a bias voltage.

The present invention also provides a THz-wave generation/detection module and a device including the same, which efficiently suppress the transmission of an optical signal in an infrared range.

The present invention also provides a THz-wave generation/detection module and a device including the same, which efficiently decrease the reflection loss of an optical signal.

Embodiments of the present invention provide THz-wave generation/detection modules including: a photomixer chip including an active layer, an antenna, and a plurality of electrode pads; a lens disposed on the photomixer chip; a Printed Circuit Board (PCB) including a plurality of solder balls connected to the electrode pads, under the photomixer chip; and a package surrounding a bottom and side of the PCB, and dissipating heating of the active layer, which is transferred from the electrode pad of the photomixer chip to the PCB, to outside.

In some embodiments, the PCB may further include: a substrate body having a first center hole at a center thereof, and having a first outer hole at an edge of the first center hole; a plurality of via electrodes vertically connected to the solder balls, in the substrate body; and a plurality of ground plates horizontally connected to the via electrodes.

In other embodiments, the ground plates may be connected to a bottom and side of the substrate body in the package.

In still other embodiments, the THz-wave generation/detection module may further include a conductive adhesive joining and fixing the PCB and the package.

In even other embodiments, the package may include: a lower package surrounding a bottom and side of the PCB; and an upper package fixing the lens onto the lower package.

In yet other embodiments, the lower package may include: a package body having a second center hole formed at a center thereof, and having a second outer hole formed at an edge of the second center hole; and a trench formed adjacently to the second outer hole in a fan shape.

In further embodiments, the THz-wave generation/detection module may further include: a bias electrode insulated from the via electrodes and the ground plates; and a power service line connected to the ground plates, and inserted into the first and second outer holes.

In still further embodiments, the upper package may include: a support package supporting the lens; and a cover package covering a side of the lens, on the support package.

In even further embodiments, the upper package may further include a first junction part connecting the support package and the cover package.

In yet further embodiments, the package may further include a second junction part connecting the support package and the lower package.

In much further embodiments, the substrate body may include aluminum nitride.

In still much further embodiments, the THz-wave generation/detection module may further include at least one of: a grating layer such as thin film filter and surface relief grating formed at an upper surface of the photomixer chip or a bottom of the lens; and a black matrix layer formed at an upper surface of the lens.

In other embodiments of the present invention, THz-wave generation/detection devices include: an optical fiber transferring a pulse or continuous wave laser beam having a plurality of wavelengths; an optical fiber assembly module fixing an end of the optical fiber; and a THz-wave generation/detection module, wherein the THz-wave generation/detection module includes: a photomixer chip including an active layer generating a THz wave from the pulse or continuous wave laser beam in the optical fiber fixed in the optical fiber fixing module, an antenna, and a plurality of electrode pads; a lens disposed on the photomixer chip; a PCB including a plurality of solder balls connected to the electrode pads, under the photomixer chip facing the lens; and a package surrounding a bottom and side of the PCB, and dissipating heating of the active layer, which is transferred from the electrode pad of the photomixer chip to the PCB, to outside.

In some embodiments, the THz-wave generation/detection device may further include: a ferrule aligning the optical fiber in the optical fiber fixing module; and an aspherical lens focusing the pulse or continuous wave laser beam, which is emitted from the optical fiber aligned in the ferrule, to the active layer.

In other embodiments, an end of the optical fiber aligned in the ferrule may have an inclined angle of about eight degrees.

In still other embodiments, the optical fiber assembly module may include: first to third housings fixing the ferrule and the aspherical lens; a boot connected to the first housing; and a connection ring fixing the third housing to the lower package.

In even other embodiments, the aspherical lens may have an inclined angle of about five degrees.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. Moreover, since preferred embodiments are provided below, the order of the reference numerals given in the description is not limited thereto.

Figure 1:
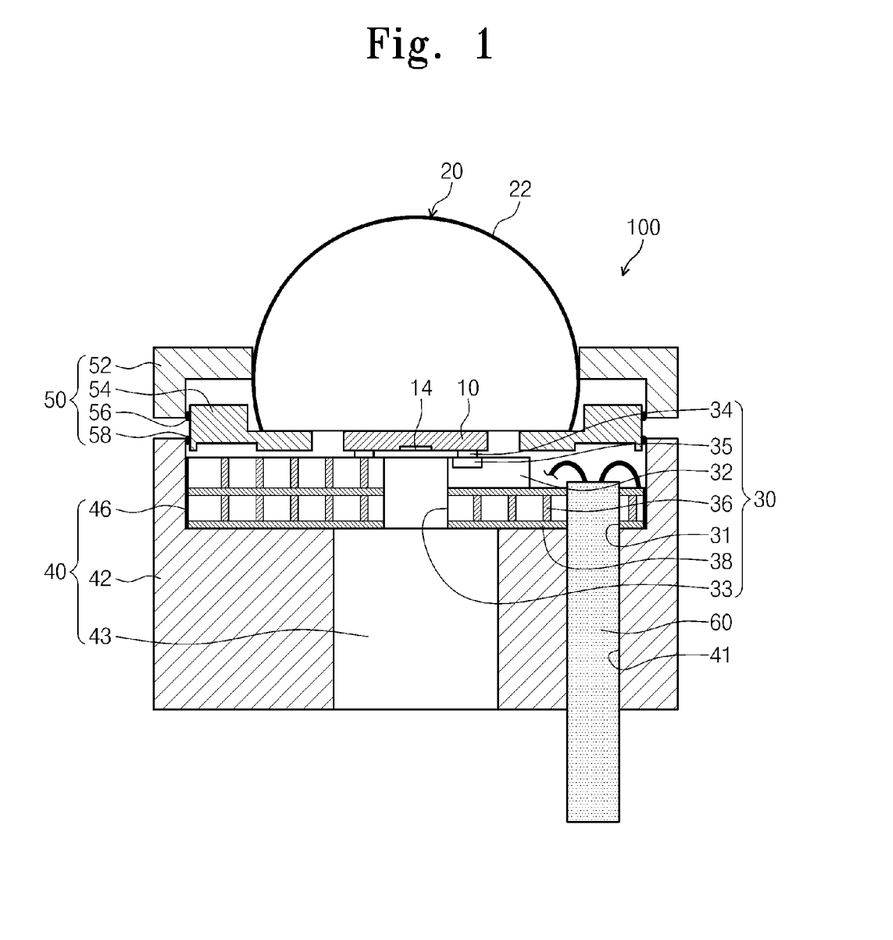
FIG. 1 is a sectional view illustrating a THz-wave generation/detection module according to an embodiment of the present inventive concept.
Figure 2:
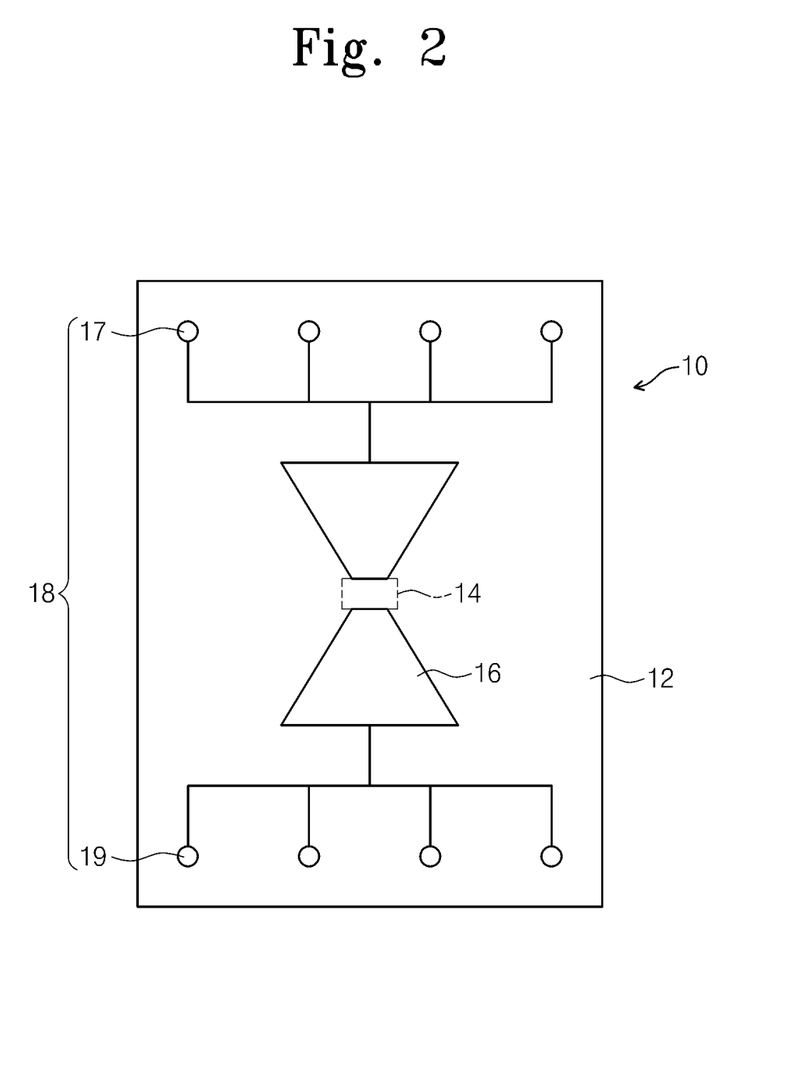
FIG. 2 is a plan view illustrating a photomixer chip of FIG. 1.
Figure 3A:
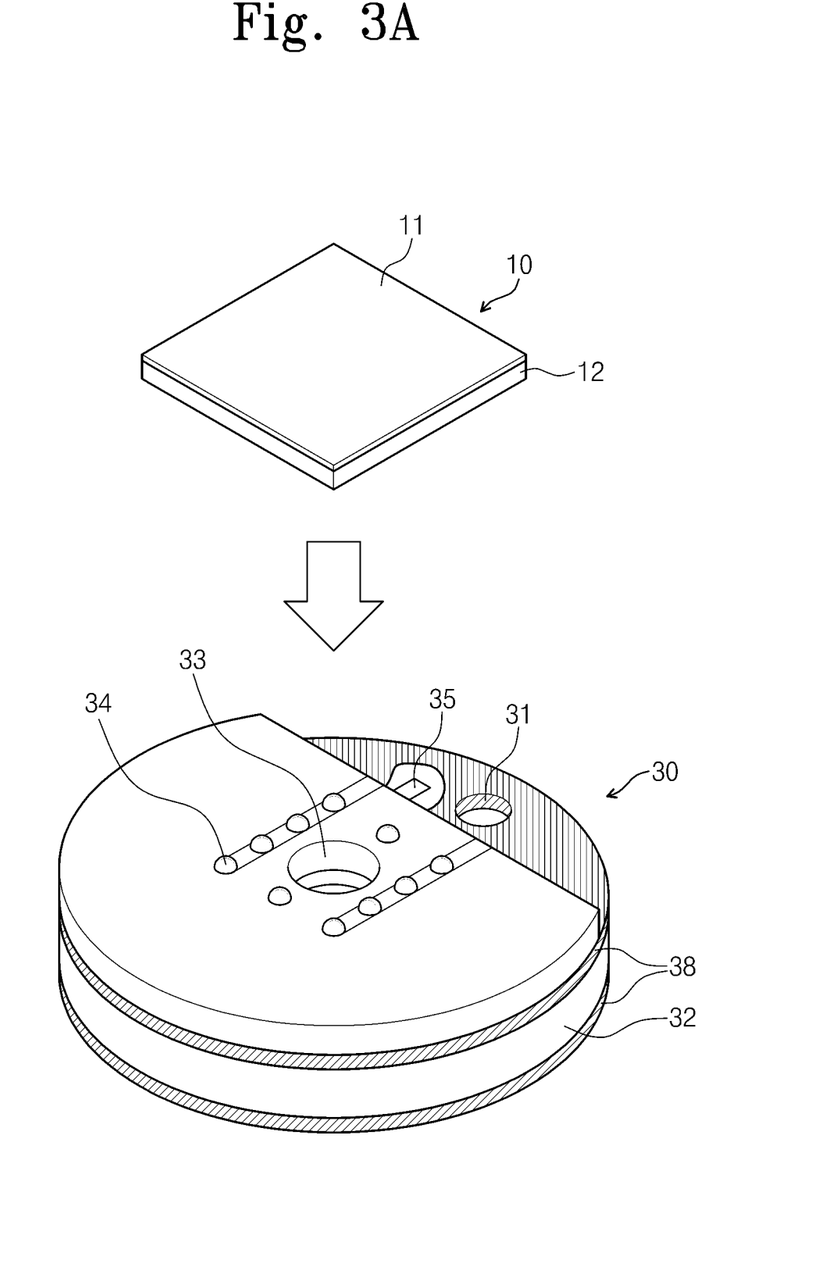
FIG. 3A is a disassembly perspective view illustrating a photomixer chip and a Printed Circuit Board (PCB)
Figure 3B:
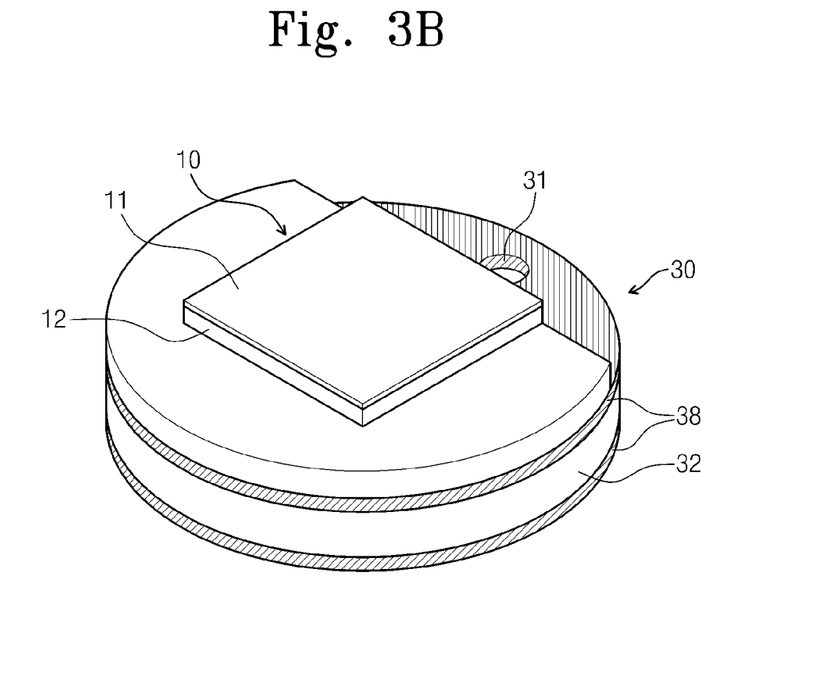
FIG. 3B is an assembly perspective view illustrating the photomixer chip and the PCB.
Figure 4:
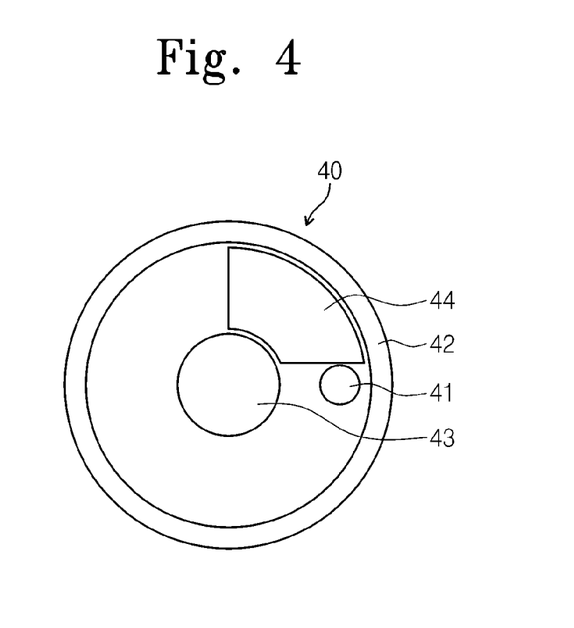
FIG. 4 is a planar view illustrating a lower package

FIG. 1 is a sectional view illustrating a THz-wave generation/detection module according to an embodiment of the present inventive concept. FIG. 2 is a plan view illustrating a photomixer chip of FIG. 1. FIG. 3A is a disassembly perspective view illustrating a photomixer chip and a Printed Circuit Board (PCB). FIG. 3B is an assembly perspective view illustrating the photomixer chip and the PCB. FIG. 4 is a planar view illustrating a lower package Referring to FIGS. 1 to 4, a THz-wave generation/detection module 100 according to an embodiment of the present inventive concept may include a PCB 30 having a heat dissipation structure for cooling a photomixer chip 10, and a lower package 40. The lower package 40 may be formed of a metal material excellent in heat transfer. The PCB 30 may include a plurality of solder balls 34 connected to an electrode pad 18 of the photomixer chip 10, a plurality of via electrodes 36 connected to the solder balls 34, and at least one of the ground plates 38 connected to the via electrodes 36. The via electrodes 36 and the ground plates 38 may be densely disposed inside and outside a substrate body 32. The solder balls 34, the via electrodes 36 and the ground plates 38 may include a conductive metal excellent in heat transfer as in the lower package 40. The PCB 30 and the lower package 40 may effectively dissipate the heating of the photomixer chip 10, and have a heat dissipation structure that prevents characteristic of the photomixer chip 10 from being degraded.

Therefore, the THz-wave generation/detection module 100 according to an embodiment of the present inventive concept can increase or maximize heat dissipation efficiency.

The photomixer chip 10 may include an active layer 14 formed at the center of a chip substrate 12, a plurality of antennas 16 formed at both sides of the active layer 14, and a plurality of electrode pads 18 connected to the antennas 16. The active layer 14 may include Indium gallium arsenic (InGaAs) grown at a low temperature, or InGaAs with ion-injected iron (Fe+). The antennas 16 may include a dipole antenna, a bow-tie antenna, or a log-spiral antenna. One of the antennas 16 may receive a bias voltage, and the other may be grounded. The electrode pads 18 may include a plurality of electrode pads 17 for bias and a plurality of ground electrode pads 19. The electrode pads 18 may be disposed at an edge of the active layer 14 and edges of the antennas 16. The bias voltage may be applied to the active layer 14 through the electrode pad 17 for bias and the antennas 16. Also, a pulse or Continuous Wave (CW) laser beam having a plurality of wavelengths may be applied to the active layer 14. The active layer 14 may generate THz wave through photoconductive switching.

A hyper-hemispherical lens 20 may be disposed on the photomixer chip 10. The hyper-hemispherical lens 20 may include high-resistance silicon having a sheet resistance of 10 k$\Omega$-cm or greater. The hyper-hemispherical lens 20 may absorb infrared light and transmit THz wave. A grating layer such as thin film filter and surface relief grating 11 may be formed at an upper surface of the photomixer chip 10 or a bottom of the hyper-hemispherical lens 20 near to the photomixer chip 10. Also, a black matrix layer 22 may be formed at an upper surface of the hyper-hemispherical lens 20. The grating layer such as thin film filter and surface relief grating 11 may prevent an optical signal in an infrared range from being transmitted to a free space, and the black matrix layer 22 may absorb an optical signal, which is propagated to the free space, in the infrared range. The thin film filter and surface relief grating 11 may be formed by alternately depositing titanium dioxide ($TiO_2$) and silicon dioxide ($SiO_2$) in several tens of layers and by etching groove patterns on the surface, respectively. The black matrix layer 22 may include a black polymer The hyper-hemispherical lens 20 may be fixed by an upper package 50. The upper package 50 may include a support package 54 supporting the hyper-hemispherical lens 20, and a cover package 52 fixing a side of the hyper-hemispherical lens 20 on the support package 54. The cover package 52 and the support package 54 may be connected by a first junction part 56. A plurality of junction parts 58 may connect the support package 54 of the upper package 50 and the lower package 40.

As described above, the PCB 30 may include a conductive metal excellent in heat transfer from the photomixer chip 10 to the lower package 40. A power service line 60 may be inserted into first and second outer holes 31 and 41 of the lower package 40 and PCB 30. The power service line 60 may include a coaxial cable. The power service line 60 may be connected to a bias terminal 35 and a plurality of ground plates 38. The ground plates 38 may become a ground terminal. The bias terminal 35 may be exposed to outside the substrate body 32, or may be connected to the solder balls 34 in a state where the ground plates 38 has been buried in an outermost surface of the substrate body 32. Herein, when the power service line 60 is directly connected to the electrode pads 18 of the photomixer chip 10, reliability for junction may be decreased. Also, heating from the photomixer chip 10 may not be prevented, and a device size may be increased. Accordingly, the PCB 30 can enhance electrical and thermal characteristics between the electrode pads 18 of the photomixer chip 10 and the power service line 60. Moreover, the PCB 30 can reduce a device size.

The solder balls 34 of the PCB 30 may be electrically connected to the electrode pads 18 of the photomixer chip 10. Also, the solder balls 34 may be joint to a surface of the chip substrate 12 as well as the electrode pads 18. The substrate body 32 may be formed of resin (which is a material for PCB) or aluminum nitride. Aluminum nitride may have thermal conductivity far better than resin. A first center hole 33 may be formed at the center of the substrate body 32. The via electrodes 36 may be vertically disposed in the substrate body 33 around the first center hole 33. The via electrodes 36 may connect the solder balls 34 and the ground plates 38. The ground plates 38 may be disposed at the inside and bottom of the substrate body 32. The ground plates 38 may be connected to the lower package 40 at the side and bottom of the substrate body 32.

The ground plates 38 disposed under the substrate body 32 may increase a surface area contacting the lower package 40. The PCB 30 and the lower package 40 may be fixed by a conductive adhesive 46. The bias electrodes 35 may be insulated from the ground plates 38 and the via electrodes 36 by the substrate body 32. The bias electrodes 35 may be electrically connected to at least one of wirings of the power service line 60. Although not shown, the bias electrodes 35 may be insulated from the ground plates 38 and the via electrodes 36, and thus exposed to under the PCB 30. Due to this reason, when the bias electrodes 35 are formed inside the substrate body 32, the ground plates 38 may be removed from a portion of the substrate body 32.

The lower package 40 may be separated from the bias electrodes 35 and contact the ground plates 38 electrically and thermally. The lower package 40 may include a package body 42 having a second outer hole 41 that is formed at an edge of a second center hole 43, and a trench 44 formed adjacently to the second outer hole 41 of the package body 42. The package body 42 may accommodate the PCB 30, and be electrically and thermally connected to the ground plates 38 of the PCB 30. Also, the electrical and thermal characteristics of the ground plates 38 and package body 42 can be enhanced by the conductive adhesive 46. The conductive adhesive 46 may fix the package body 42 and the PCB 30. For example, the conductive adhesive 46 may include silver epoxy or silver tin (AgSn).

The trench 44 may separate the package body 42 from the bias electrodes 35. Accordingly, the trench 44 can prevent short between the package body 42 and the bias electrodes 35. The trench 44 may be formed in a fan shape from the second center hole 43 to an edge thereof. The trench 44 can optimize a contact area between the ground plate 38 of the PCB 30 and the lower package 40.

Accordingly, the THz-wave generation/detection module 100 according to an embodiment of the present inventive concept can increase or maximize heat dissipation efficiency.

Figure 5A:
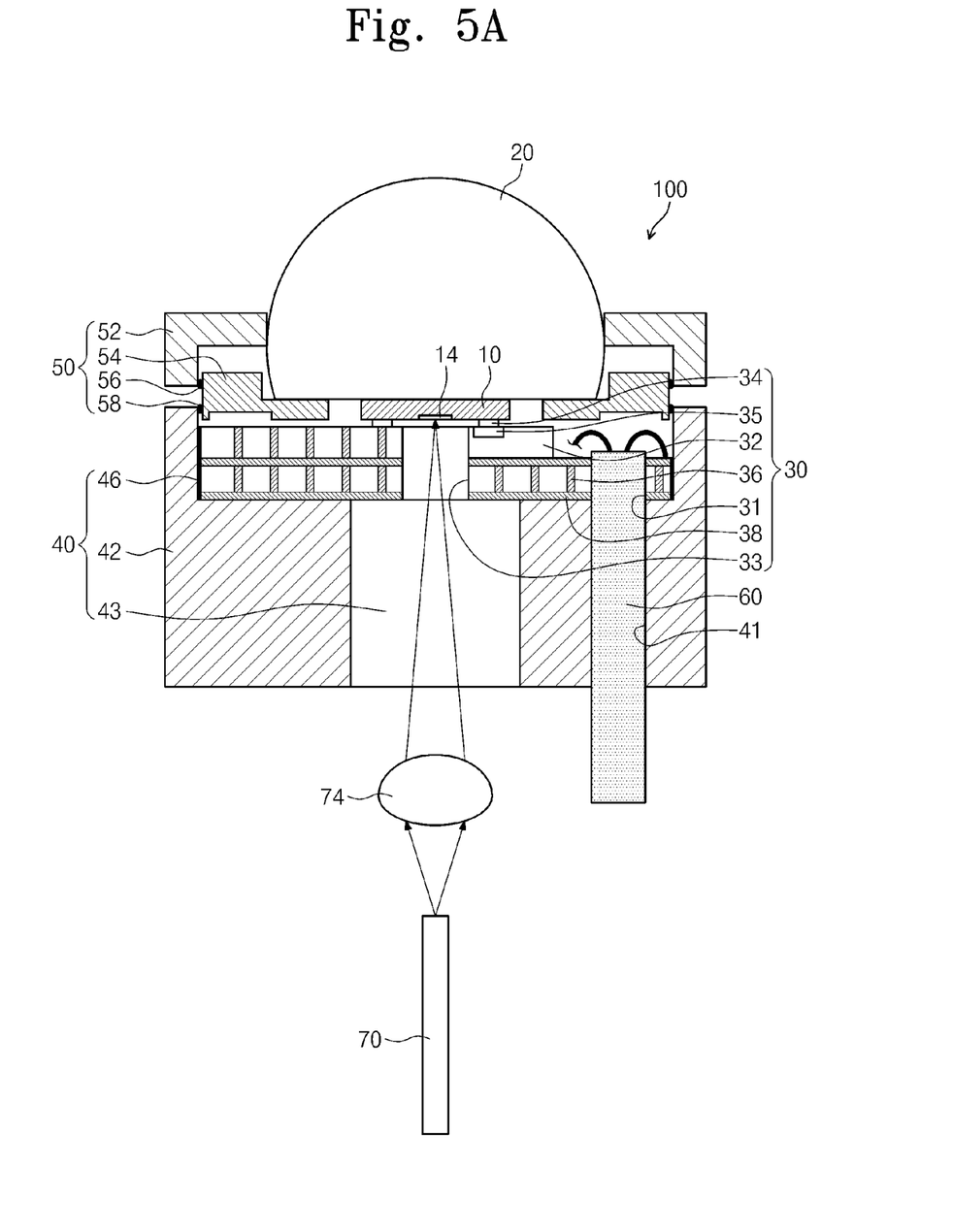
FIGS. 5A to 5C are sectional views conceptually illustrating a THz-wave generation/detection module according to an embodiment of the present inventive concept.
Figure 5B:
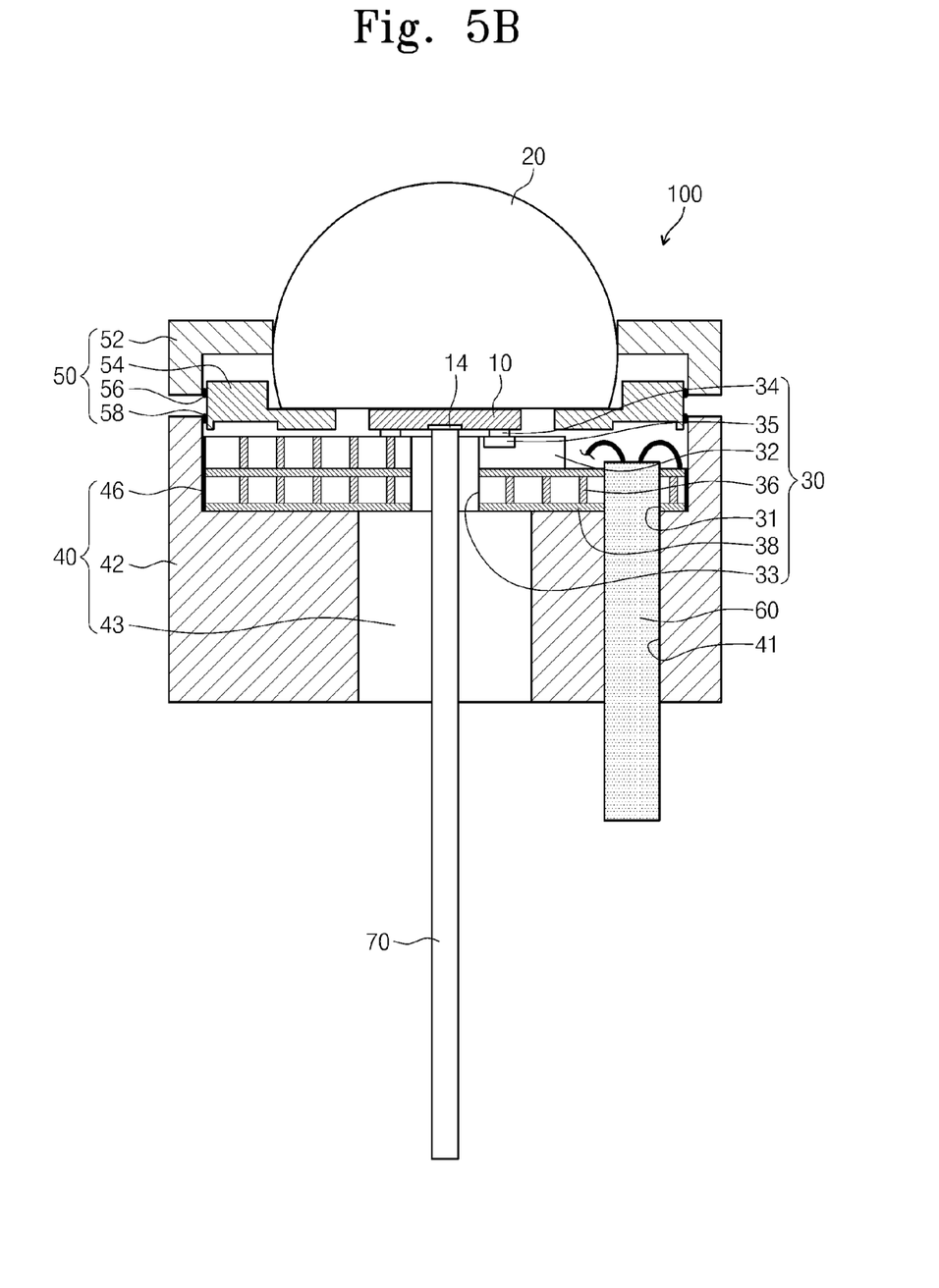
Figure 5C:
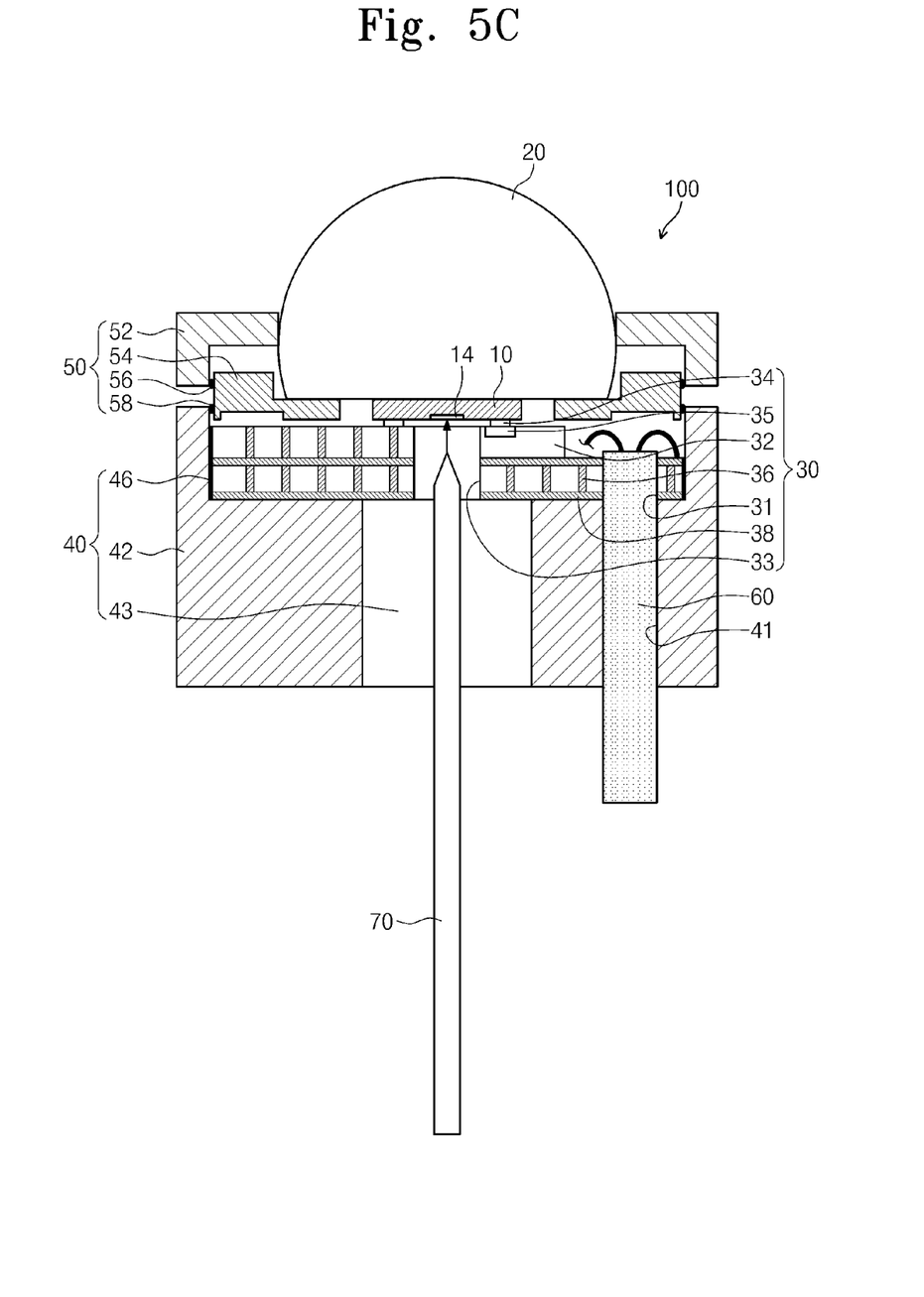
Figure 6:
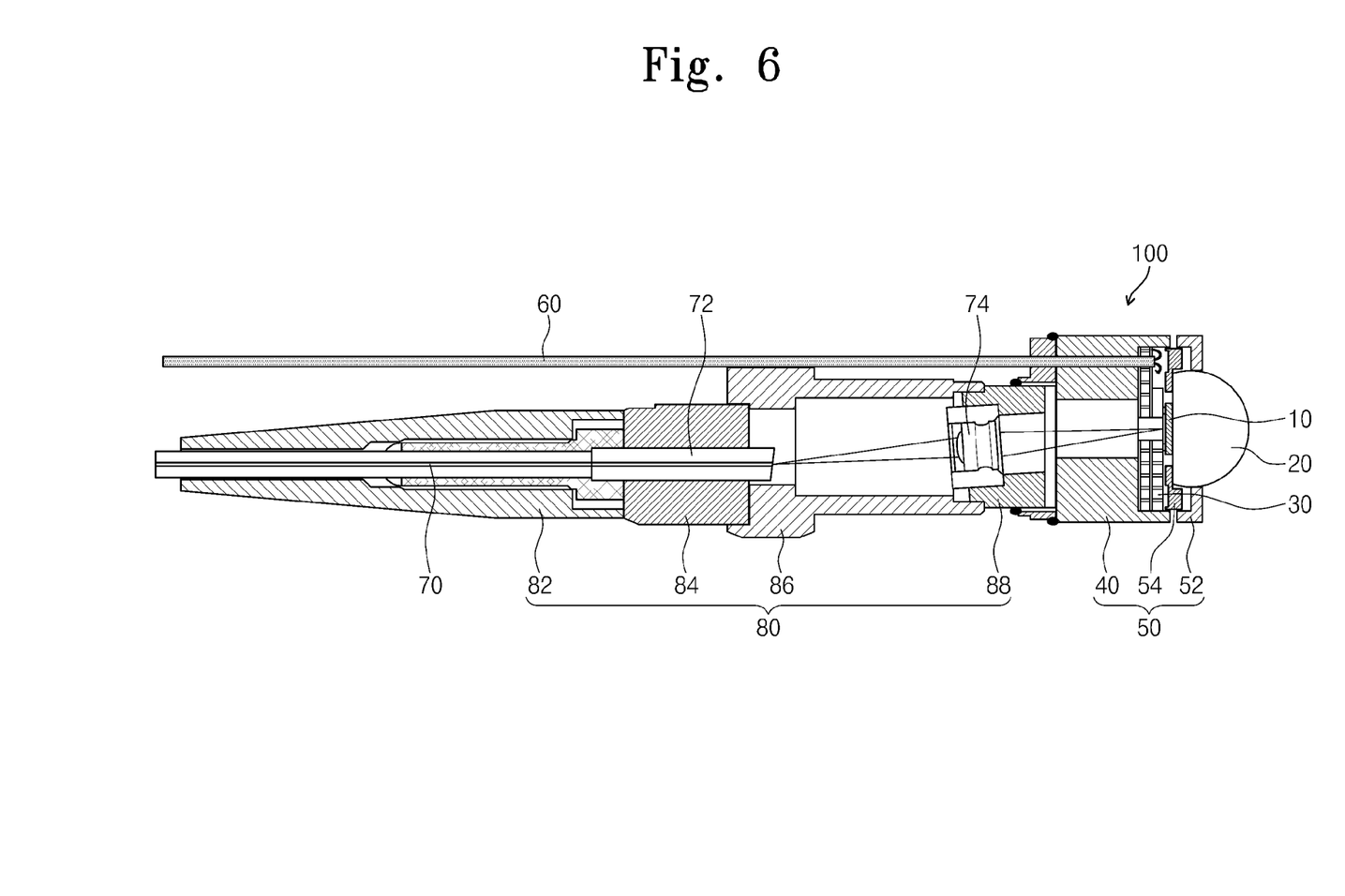
FIG. 6 is a sectional view illustrating in detail a device including the THz-wave generation/detection module of FIG. 5A.
Figure 7A:
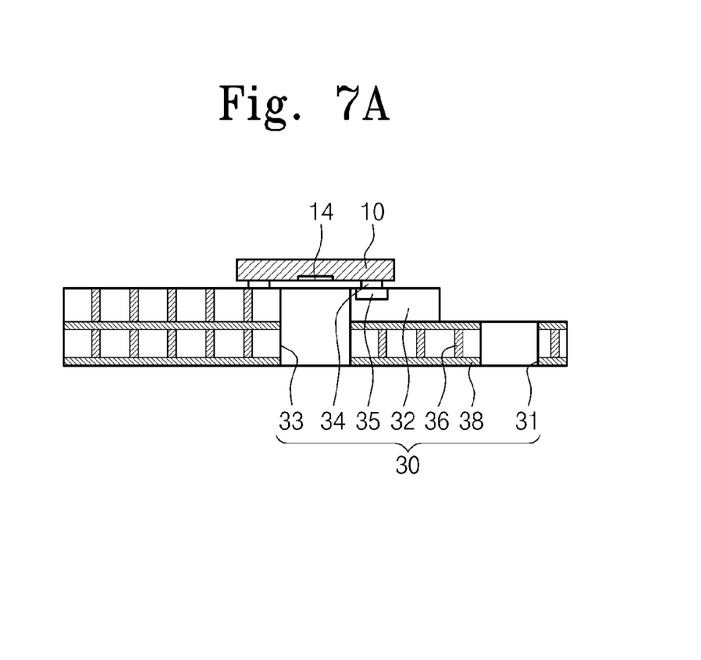
FIGS. 7A to 7E are sectional views sequentially illustrating a method of manufacturing a THz-wave generation/detection module, according to an embodiment of the present inventive concept.
Figure 7B:
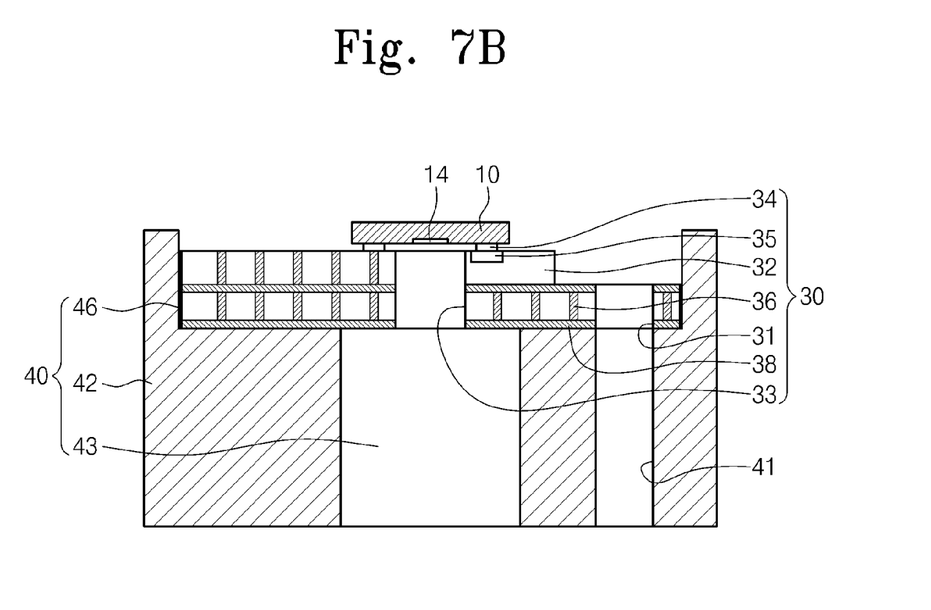
Figure 7C:
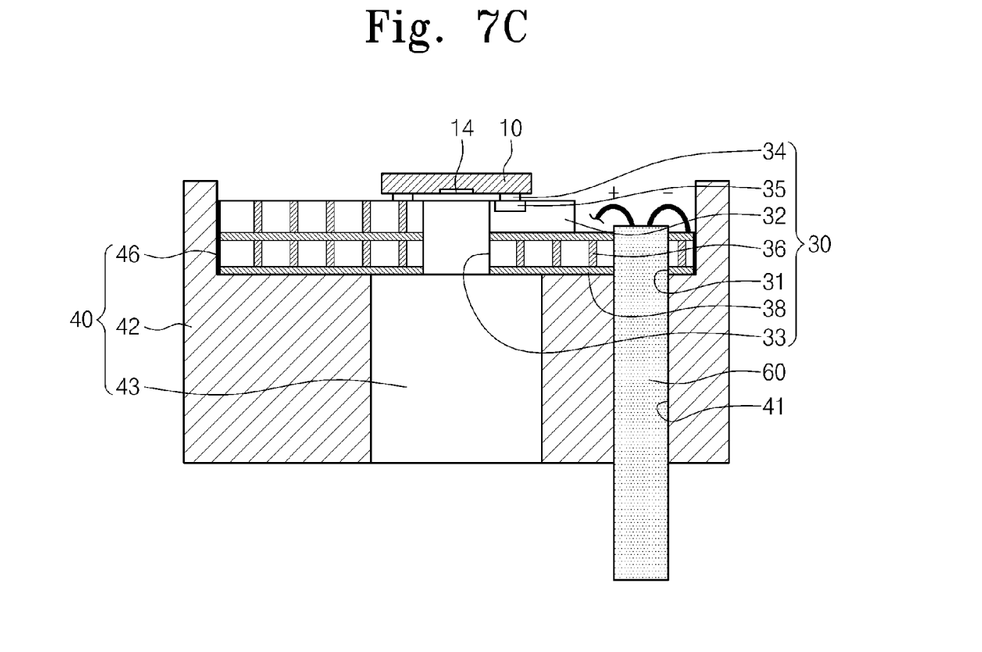
Figure 7D:
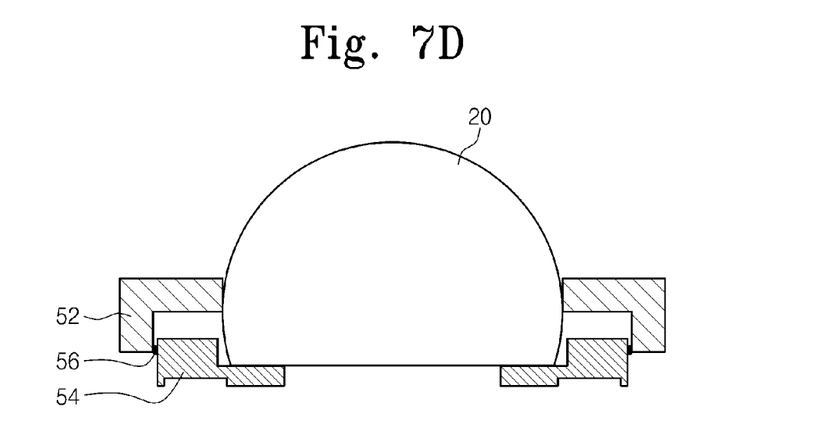
Figure 7E:
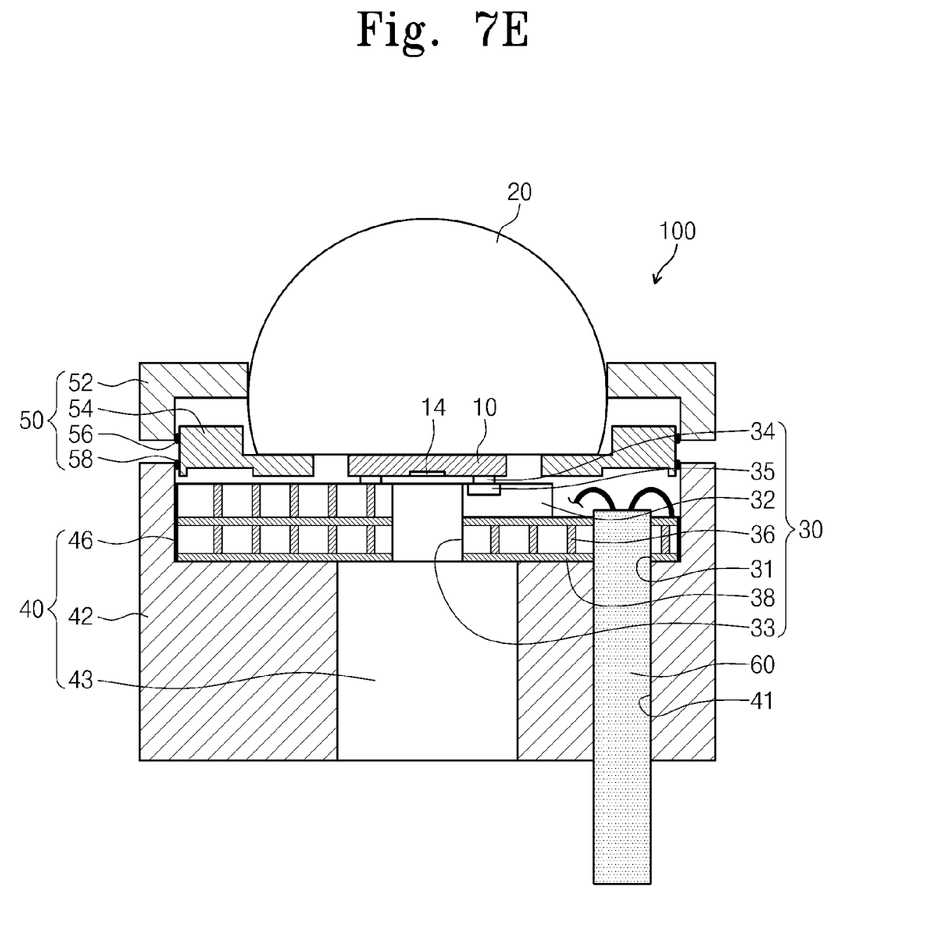

FIGS. 5A to 5C are sectional views conceptually illustrating the THz-wave generation/detection module 100 according to an embodiment of the present inventive concept. FIG. 6 is a sectional view illustrating in detail a device including the THz-wave generation/detection module 100 of FIG. 5A.

Referring to FIGS. 5A to 6, a THz-wave generation/detection device according to another embodiment of the present inventive concept may include an optical fiber 70 and an optical fiber assembly module 80 fixing the optical fiber 70 in a certain direction. Herein, the optical fiber 70 irradiates multi-wavelength laser beams, supplied from a dual mode laser source (not shown), on an active layer of a photomixer chip 10.

The optical fiber 70 may include a single mode optical fiber. The optical fiber 70 may supply a pulse or CW laser beam having a plurality of wavelengths to the active layer 14 of the photomixer chip 10. The optical fiber 70 may supply a pulse or CW laser beam having a plurality of wavelengths to the active layer 14 of the photomixer chip 10 in a scheme such as aspherical lens coupling (see FIG. 5A), optical fiber direct coupling (see FIG. 5B), or lens-type optical fiber coupling (see FIG. 5C). Optical fiber direct coupling denotes direct coupling between the active layer 14 and the optical fiber 70. In aspherical lens coupling and lens-type optical fiber coupling, a free space corresponding to an air gap may exist between the active layer 14 and the optical fiber 70. Hereinafter, a THz-wave generation/detection device based on the aspherical lens coupling scheme will be described as a representative example.

The THz-wave generation/detection device based on the aspherical lens coupling scheme may include a ferrule 72 for aligning the optical fiber 70, and at least one aspherical lens 74 that focuses a pulse or CW laser beam, which is emitted from an end of the optical fiber 70 aligned in the ferrule 72, to the active layer 14. The ferrule 72 may include an Angled Physical Contact (APC) ferrule that is manufactured in order for the end of the optical fiber 70 to have an inclined surface of about eight degrees. The aspherical lens 74 may include a lens such as 1:1 or 2:1. The aspherical lens 74 may be fixed at an inclined angle of five degrees or greater or less with respect to a vertical surface of a lower package 40.

The optical fiber assembly module 80 may fix the optical fiber 70, the ferrule 72, and the aspherical lens 74. For example, the optical fiber assembly module 80 may include a boot 82 fixing the optical fiber 70, a first housing 84 fixing the ferrule 72, second and third housings 86 and 88 fixing the aspherical lens 74, and a connection ring 89 connected to the third housing 88 and the lower package 40. The connection ring 89 and the lower package 40 may be coupled by a third junction part 76. Also, the third housing 88 and the connection ring 89 may be connected by the third junction part 76. The first to third housings 84, 86 and 88 may include a metal as in the lower package 40.

Accordingly, the THz-wave generation/detection device according to another embodiment of the present inventive concept can increase or maximize heat dissipation efficiency.

The following description will be made on the THz-wave generation/detection module 100 according to the above-described embodiments of the present inventive concept and a method of manufacturing the device including the same.

FIGS. 7A to 7E are sectional views sequentially illustrating a method of manufacturing the THz-wave generation/detection module 100, according to an embodiment of the present inventive concept.

Referring to FIGS. 1 to 7A, the photomixer chip 10 and the PCB 30 are connected. The electrode pads 18 of the photomixer chip 10 and the solder balls 34 of the PCB 30 may be bonded in self-passive alignment.

Referring to FIGS. 1 to 7B, the PCB 30 is fixed to the lower package 40. The PCB 30 and the lower package 40 may be joint and fixed by the conductive adhesive 46.

Referring to FIGS. 1 to 7C, the power service line 60 is connected to the PCB 30. The power service line 60 may pass through the PCB 30 and the first and second outer holes 31 and 41 of the lower package 40.

Referring to FIGS. 1 to 7D, the upper package 50 is fixed to the hyper-hemispherical lens 20. As described above, the upper package 50 may include the support package 54 supporting the hyper-hemispherical lens 20, and a cover package 52 fixing a side of the hyper-hemispherical lens 20 on the support package 54. The cover package 52 and the support package 54 may be connected by the first junction part 56. The first junction part 56 may be formed through laser welding.

Referring to FIGS. 1 to 7E, the active layer 14 of the photomixer chip 10 and the hyper-hemispherical lens 20 are aligned, and the upper package 50 and the lower package 40 are connected. The upper package 50 and the lower package 40 may be connected by the second junction part 58. Likewise, the first junction part 58 may be formed through laser welding.

Referring to FIG. 6, the optical fiber 70 and the optical fiber assembly module 80 are connected to one surface of the lower package 40 facing the upper package 50. The optical fiber 70 may be fixed by the ferrule 72. The aspherical lens 74 may be disposed between the ferrule 72 and the lower package 40. The ferrule 72 and the aspherical lens 74 may be fixed by the connection ring 89 and the first to third housings 84, 86 and 88. The connection ring 89 may fix the third housing 88 and the lower package 40 with the third junction parts 76. The third junction parts 76 may be formed through laser welding.

As described above, according to the embodiments of the present inventive concept, the PCB may electrically and thermally connect the photomixer chip and the package. The PCB can reduce the sizes of the photomixer chip and package. The PCB may include the solder balls, the via electrodes, and the ground plates. The ground plates can increase a contact area to the package. Accordingly, the PCB and the package can increase or maximize heat dissipation efficiency. Also, the bias voltage can be efficiently applied from the power service line through the solder ball and bias terminal of the PCB. The PCB and the package can suppress the transmission of the optical signal from the grating layer such as thin film filter and surface relief grating formed at the bottom of the hyper-hemispherical lens or the upper surface of the photomixer chip, and efficiently decrease the reflection loss of the optical signal from the black matrix layer formed at the upper surface of the hyper-hemispherical lens.

The above-disclosed subject matter is to be considered illustrative, and not restrictive, and the appended claims are intended to cover all such modifications, enhancements, and other embodiments, which fall within the true spirit and scope of the present inventive concept. Thus, to the maximum extent allowed by law, the scope of the present inventive concept is to be determined by the broadest permissible interpretation of the following claims and their equivalents, and shall not be restricted or limited by the foregoing detailed description.

What is claimed is:

1. A THz-wave generation/detection module comprising:
   a photomixer chip comprising an active layer, an antenna, and a plurality of electrode pads;
   a lens disposed on the photomixer chip;
   a Printed Circuit Board (PCB) comprising a plurality of solder balls connected to the electrode pads, under the photomixer chip; and
   a package surrounding a bottom and side of the PCB, and dissipating heating of the active layer, which is transferred from the electrode pads of the photomixer chip to the PCB, to outside,
   wherein the PCB further comprises:
   a substrate body having a first center hole at a center thereof, and having a first outer hole at an edge of the first center hole;
   a plurality of via electrodes vertically connected to the solder balls, in the substrate body; and
   a plurality of ground plates horizontally connected to the via electrodes.

2. The THz-wave generation/detection module of claim 1, wherein the ground plates are connected to a bottom and side of the substrate body in the package.

3. The THz-wave generation/detection module of claim 2, further comprising a conductive adhesive bonding and fixing the PCB and the package.

4. The THz-wave generation/detection module of claim 3, wherein the package comprises:
   a lower package covering and contacting the second surface and the side of the PCB; and
   an upper package fixing the lens onto the lower package.

5. The THz-wave generation/detection module of claim 4, wherein the lower package comprises:
   a package body having a second center hole formed at a center thereof, and having a second outer hole formed at an edge of the second center hole; and
   a trench formed adjacently to the second outer hole in a fan shape.

6. The THz-wave generation/detection module of claim 5, further comprising:
   a bias electrode insulated from the via electrodes and the ground plates; and
   a power service line connected to the ground plates, and inserted into the first and second outer holes.

7. The THz-wave generation/detection module of claim 4, wherein the upper package comprises:
   a support package supporting the lens; and
   a cover package covering a side of the lens, on the support package.

8. The THz-wave generation/detection module of claim 7, wherein the upper package further comprises a first junction part connecting the support package and the cover package.

9. The THz-wave generation/detection module of claim 7, wherein the package further comprises a second junction part connecting the support package and the lower package.

10. The THz-wave generation/detection module of claim 1, wherein the substrate body comprises aluminum nitride.

11. The THz-wave generation/detection module of claim 1, further comprising at least one of: a grating layer formed at an upper surface of the photomixer chip or a bottom of the lens; and a black matrix layer formed at an upper surface of the lens.

12. A THz-wave generation/detection device comprising:
   an optical fiber transferring a pulse or continuous wave laser beam having a plurality of wavelengths;

an optical fiber assembly module fixing an end of the optical fiber; and a THz-wave generation/detection module, wherein the THz-wave generation/detection module comprises:

a photomixer chip comprising an active layer generating a THz wave from the pulse or continuous wave laser beam in the optical fiber fixed in the optical fiber assembly module, an antenna, and a plurality of electrode pads;

a lens disposed on the photomixer chip;

a Printed Circuit Board (PCB) comprising a plurality of solder balls connected to the electrode pads, under the photomixer chip facing the lens;

a package surrounding a bottom and side of the PCB, and dissipating heating of the active layer, which is transferred from the electrode pads of the photomixer chip to the PCB, to outside;

a ferrule aligning the optical fiber in the optical fiber fixing module; and an aspherical lens focusing the pulse or continuous wave laser beam, which is emitted from the optical fiber aligned in the ferrule, to the active layer, wherein the optical fiber assembly module comprises:

first to third housings fixing the ferrule and the aspherical lens;

a boot connected to the first housing; and a connection ring fixing the third housing to the lower package.

13. The THz-wave generation/detection device of claim 12, wherein an end of the optical fiber aligned in the ferrule has an inclined angle of about eight degrees.

14. The THz-wave generation/detection device of claim 12, wherein the aspherical lens has an inclined angle of about five degrees.

* * * * *